United States Patent [19]

Woo Suck

[11] Patent Number: 4,759,389
[45] Date of Patent: Jul. 26, 1988

[54] SYNTHETIC RESIN PIPE FOR UNDERGROUND INSTALLATION

[76] Inventor: Kim Woo Suck, 699-11, Yonsan-dong, Tongne-gu, Pusan, Rep. of Korea

[21] Appl. No.: 937,737

[22] Filed: Dec. 4, 1986

[51] Int. Cl.⁴ .............................................. F16L 11/08
[52] U.S. Cl. .................................... 138/154; 138/122
[58] Field of Search ............... 138/154, 122, 132, 174; 405/49; 156/143, 144, 195

[56] References Cited

U.S. PATENT DOCUMENTS

| | | | |
|---|---|---|---|
| 3,495,628 | 2/1970 | Boender | 138/150 |
| 4,209,043 | 6/1980 | Menzel | 138/129 |
| 4,303,104 | 12/1981 | Hegler et al. | 138/173 |
| 4,471,813 | 9/1984 | Cothran | 138/154 |
| 4,628,966 | 12/1986 | Kanao | 138/122 |

FOREIGN PATENT DOCUMENTS 1894 5/1979 European Pat. Off. ............ 156/195

Primary Examiner—Henry J. Recla
Assistant Examiner—L. J. Peters
Attorney, Agent, or Firm—Robin, Blecker & Daley

[57] ABSTRACT

A synthetic resin pipe for underground installation includes a synthetic resin strip which is spirally wound and joined to form an elongated pipe. The outer surface of this elongated pipe is smooth and continuous. Reinforcing ribs of the strip have hollow centers and protrude radially inwardly. Strip lateral extents which are adjacent to the reinforcing ribs are joined to form the smooth outer surface of the pipe and also to form an inner wall between adjacent reinforcing ribs.

1 Claim, 3 Drawing Sheets (A)

SYNTHETIC RESIN PIPE FOR UNDERGROUND INSTALLATION

FIELD OF THE INVENTION

The present invention relates generally to synthetic resin pipes to be installed underground and more particularly for uses, such as a telephone line protecting tube, a well pipe, a manhole pipe or as a connecting portion between underground pipes.

BACKGROUND OF THE INVENTION

The use of pressure-resistant reinforcing spiral hollow ribs on underground synthetic resin pipes is known in the prior art. However, these ribs have always appeared on the external circumferential surface of the pipe, partly because these underground pipes were used mostly for water supply and drainage, but also because of circumstances in the manufacturing techniques for general spiral-ribbed pipes.

The use of underground resin pipe in other applications has been rapidly expanding. For example, these pipes are being used as protecting tubes for electric lines. In addition, these pipes have continued to be used as well pipes and manhole pipes and also to join conventional underground pipes.

Known resin pipes may be used for the purposes above state. However, there exists a number of problems in such use. The problems arise in part due to the fact that the reinforcing ribs are located on the external surface of the pipe. Certain conditions in the soil may lead to a lack of evenly distributed soil pressure along the outer surface of the pipe. For example, in situations where the outer ribs come in contact with foreign objects which are greater in diameter or width than the distance between adjacent ribs, the soil pressure is not uniform on the outer surface of the pipe. It becomes difficult to distribute the soil pressure evenly on the ribs and the portions between the ribs. The result may be intense pressure at the crest of the ribs while the area between each rib is free from contact with the soil or a foreign object. This has lead to damage to the rib portions or depressions in the wall of the pipe which would not have occurred had there been uniform soil pressure exerted on the exterior of the pipe.

Where the known resin pipes have been used as protecting tube for electric lines, problems have arisen upon inserting the electric lines into the tube. The friction coefficient is very large since the inner wall of the tube is substantially straight and has an even surface. This also makes insertions of electric lines through a long tube difficult. Such are exemplary disadvantages which accompany the conventional pipes.

SUMMARY OF THE INVENTION

The primary object of the present invention is to increase the strength of a synthetic resin pipe in residence in an underground installation.

In the effective attainment of such object, synthetic resin strip is constructed, wound in successive courses which are joined in a manner such that an elongated pipe is formed which has an outer surface which is smooth and an inner surface having reinforcing ribs. The smooth outer surface allows for uniformly distributed soil pressure to be exerted on the pipe. The reinforcing ribs, which may be hollow, protrude radially inwardly from the inner wall which is formed by joining lateral extents of the resin strip. These lateral extents are integral with the synthetic resin strip and are adjacent to the inwardly protruding reinforcing ribs. Joining these lateral extents forms an inner wall between the reinforcing ribs as well as forming the smooth outer wall.

This invention maintains the advantages of the conventional structures, while eliminating the disadvantages. The reinforcing ribs may be hollow, as in the prior art, reducing both the cost of the ribs and also the weight of the pipes. However, pipes of the present invention are superior in withstanding both pressure and deformation as compared with conventional pipes in the prior art. The strength of the pipes is increased by placing the ribs inside the pipe, such that uniform soil pressure is exerted on the smooth outer surface of the exterior of the pipe. The disadvantages of the prior art of added pressure on the rib portions which resulted in local weakenings in or localized stress concentration on the pipe do not occur.

A further object of the present invention is to provide a pipe which may be easily fitted into a prebuilt gutter or hole. The elimination of reinforcing ribs on the external surface of the pipe accomplishes this object.

It is another object of this invention to provide a synthetic resin pipe to be used as a protecting tube for electric lines such that the friction coefficient is very small when the electric line is inserted into the tube. Providing the inner wall with interior ribs accomplishes this object since only the ribs engage the electric lines.

The foregoing and other objects and features of the invention will be further understood from the following detailed description of preferred embodiments thereof and from the drawings wherein like reference numerals identify like parts throughout.

DESCRIPTION OF PREFERRED EMBODIMENTS

Figure 1:
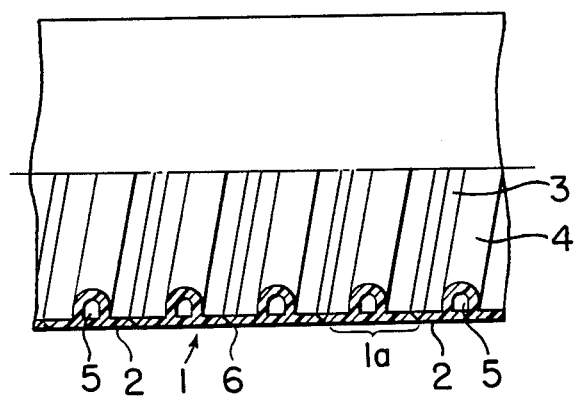
FIG. 1 is a partly cut-away and sectioned frontal view of one embodiment of synthetic resin pipe of the present invention.
Figure 2:
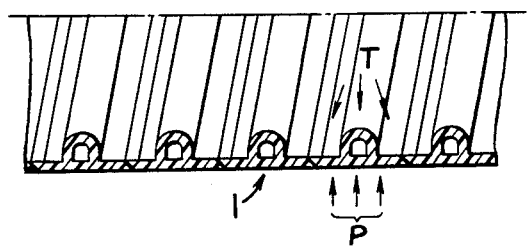
FIG. 2 is a comparative view showing the pipe of the present invention and conventional pipe, illustrating in (A) the longitudinal cross section of pipe portions of the present invention and illustrating in (B) the longitudinal cross section of the portions of a conventional pipe.
Figure 2:
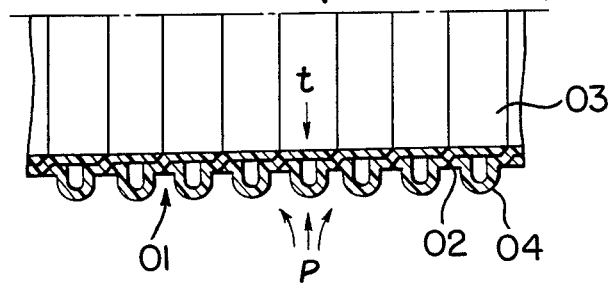

The illustrations in FIG. 1 and FIG. 2(A) show an embodiment of the present invention. The external circumferential surface 2 of the pipe body 1 is formed smoothly and continuously without protruding ribs, while its inner surface has flats 3 and spiral reinforcing ribs 4, with the ribs being dome-shaped, the ribs having hollow spaces 5 inside. These ribs protrude radially inwardly.

The pipe body 1 of the present invention is produced in such a way that the strip 1a with the dome-shaped hollow rib on it (the hollow space indicated by 5), and with the strip extended in lateral extens in respective opposite directions at the bottom of the dome-like cross-sectioned rib, is extruded from an extrusion die. An ordinary mandril is machined to make spiral grooves around it, so that the grooves receive the dome-like cross-sectional ribs. On this mandril, the strip 1a is wound in successive courses with the ribs positioned inwardly radially, and the sloped adjoining edges of the strip are joined together, making the pipe body 1 an integral part. In joining (as at 6) the successive courses of strip 1a, melt-fixing may be generally used, but using an adhesive is also contemplated.

As shown in FIG. 2(A), in comparison with conventional products (FIG. 2(B)), the conventional pipe body 01 has such disadvantages that the external pressure is imposed intensively on the crests of the reinforcing ribs 04, and this external pressure P is transmitted through the walls of the ribs 04 onto the cylindrical wall of the pipe to be dispersed thereon. This results in the portions of the cylindrical wall 02 connected to the walls of the reinforcing ribs 04 receiving deflectional force, and therefore, the withstanding strength of t of this pipe against the external pressure is diminished. Consequently, the wall of the reinforcing rib 04, which is to be subjected to external pressure, should be massively thickened, and not only so, but the intervals between the ribs should be shortened. In accordance with the present invention, however, the external pressure is uniformly distributed on the outer surface of the pipe body 1 without distribution between the rib-provided areas or non-rib-provided areas, and therefore, the pipe of the present invention exhibits a uniform withstanding strength (T) against the external pressure P. Consequently, the deformation-withstanding strength T of the surface of the pipe body 1 is not only concentrated on the areas where the ribs are attached, but also on the non-ribbed areas of the pipe body 1 providing sufficient withstanding strength. Therefore, pipes constructed in accordance with the present invention have advantage in that deformations caused by the external pressure are very small, and in that a strong withstanding strength against pressure is obtained without providing the reinforcing ribs 4 densely. Pipes of the present invention may be lighter in weight compared with the conventional pipes, and can enjoy economy in manufacturing as the required material can be less in quantity.

Figure 3:
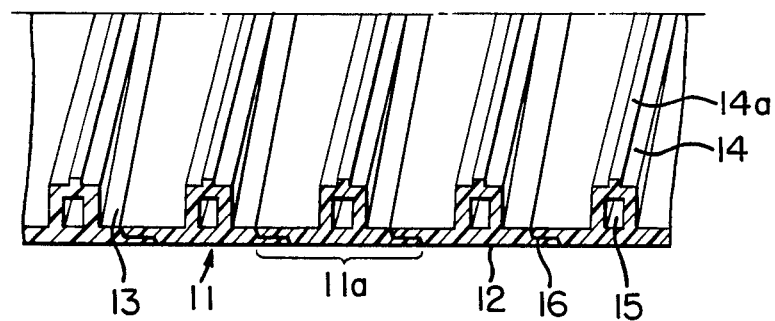
FIGS. 3 through 6 illustrate the longitudinal cross section of pipe portions of alternative embodiments according to the present invention.

FIGS. 3 through 6 show other embodiments of the present invention. In FIG. 3, the strip 11a of pipe body 11, made by extrusion forming, has interior surface 13, exterior surface 12 has a step on each of its two lateral edges. These edges with a step on each thereof, constitute overlap-joining portions 16, while the cross section of the reinforcing rib 14 is rectangular in shape, has hollow interior 15 and has a protrusion 14a on the flat top of the rib.

Figure 4:
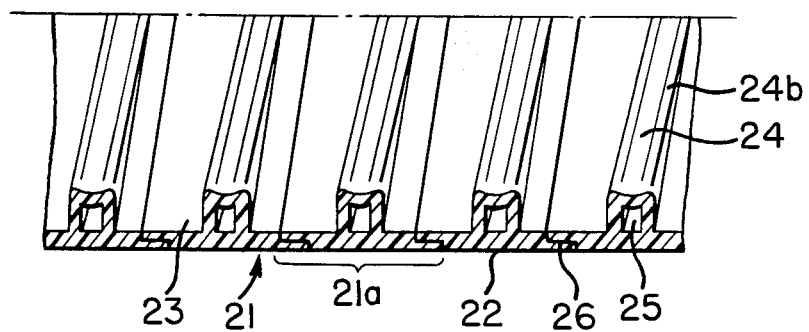

In the embodiment of pipe body 21 of FIG. 4, two edge portions 24b of the top of the reinforcing rib 24 are protruded up, and the central portion of the top forms a gentle groove. Strip 21a otherwise has interior surface 23, exterior surface 24 and hollow 25. Overlap is shown at 26.

Figure 5:
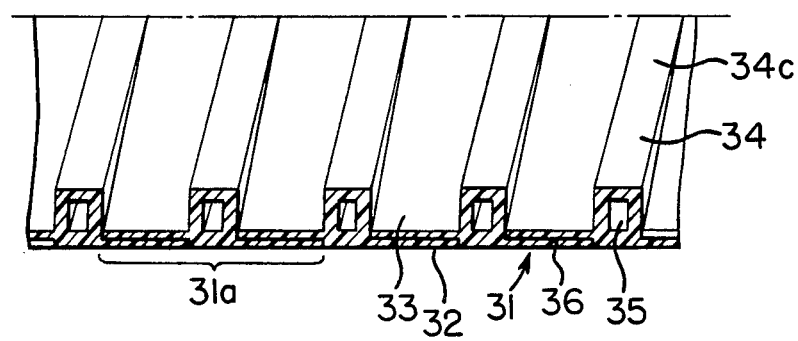

In the embodiment pipe body 31 of FIG. 5, the reinforcing rib 34 of strip 31a has a flat top 34c and hollow 35, and has two lateral extents 32 and 33 at the bottom, which are of half thickness to form the whole complete thickness of the pipe wall by being overlap-joined at 36 with the adjoining strips. For each strip 31a, it is seen in FIG. 5 that extends 32 and 33 are at different elevations. Overlap is shown at 36.

Figure 6:
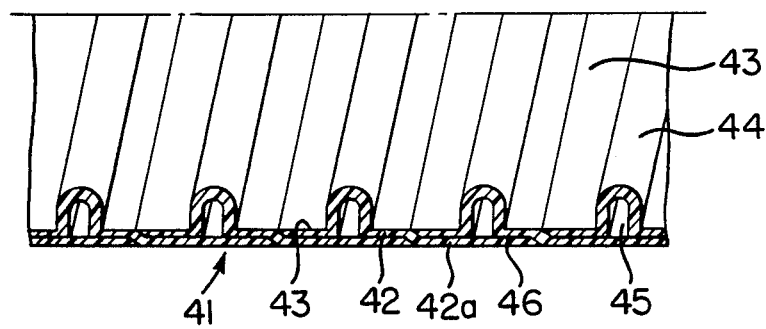

In the embodiment of pipe body 41 of FIG. 6, the reinforcing rib 44 has a deep internal groove 45, and has two lateral extents 42 and 43 at the bottom, the extent 42 being longer than the other extent 43. The longer extent portion 42 has a bent segment at an intermediate point, and the portion 42a, which corresponds to the portion beyond the bent point, stretches up to the bent point of the longer extent portion of the adjoining rib, after having passed the mouth of the deep internal groove 45a, while at the same time, the portion 42a is overlap-joined with the shorter strip portion 43 of the adjoining rib, and the length of the portion 42a corresponds to one pitch interval of the rib arrangement. Overlap is shown at 46.

The embodiment illustrated in the drawings and described above are the most typical ones, and of course, combinations of these embodiments are also possible. Therefore, it will be readily understood that shapes departing from the illustrated embodiments can also embody the present invention.

Further, the strength of the pipe of the present invention can be increased by inserting a strong reinforcing material inside the wall of the pipe by using the usual techniques in the art.

As has been made apparent by the above descriptions, pipes of the present invention are preferably manufactured by utilizing the technique of winding a synthetic resin strip spirally to form a pipe. This pipe is primarily to be used for underground installations, and its outer circumferential surface is smooth and straight and has no protrusions, while the inner surface of the pipe preferably has spirally wound ribs with a hollow space or cavity inside each of the ribs. By laying the pipe in a deep furrow which has been dug out, or by just inserting the pipe into a longitudinal hole, the external circumferential surface of the pipe is substantially brought to contact with the surrounding soil, and the soil pressure is imposed on the external surface of the pipe in approximately uniform distribution, making the installation work easier. In the case that this pipe is used as a protecting shell for electric lines, as in the case of cables, the resistance due to the insetion friction is very small, and therefore, insertions of lines through a long length of pipe is readily effected.

What is claimed is:

1. A pipe for underground installatin comprising a plurality of successive courses of wound synthetic resin strip joined to form an elongated pipe, each said synthetic resin strip course having a protruding reinforcing rib and two lateral extents, said reinforcing rib having a hollow center, said rib extending radially inwardly of said pipe and lateral extents of adjacent courses of said strip being joined to form a smooth, continuous outer pipe surface and an inner pipe wall adjacent said ribs, said lateral extents terminating in steps, said steps being overlapped in such joinder, said reinforcing ribs being rectangular in shape and having a top, two sides and a bottom, each said rib having a protrusion on the top thereof.

* * * * *